(12) United States Patent
Marusich et al.

(10) Patent No.: US 12,049,043 B2
(45) Date of Patent: Jul. 30, 2024

(54) METHODS AND SYSTEMS FOR GENERATING A THREE-DIMENSIONAL PRODUCT HAVING A CUBIC INTERNAL STRUCTURE

(71) Applicant: Proto Labs, Inc, Maple Plain, MN (US)

(72) Inventors: Troy David Marusich, Eden Prairie, MN (US); Dylan Lundberg, Otsego, MN (US); Arthur Richard Baker, Excelsior, MN (US)

(73) Assignee: Proto Labs, Inc., Maple Plain, MN (US)

( * ) Notice: Subject to any disclaimer, the term of this patent is extended or adjusted under 35 U.S.C. 154(b) by 404 days.

(21) Appl. No.: 16/847,899

(22) Filed: Apr. 14, 2020

(65) Prior Publication Data
US 2021/0299963 A1    Sep. 30, 2021

Related U.S. Application Data

(60) Provisional application No. 62/993,899, filed on Mar. 24, 2020.

(51) Int. Cl.
*G06F 30/17* (2020.01)
*B29C 64/393* (2017.01)
(Continued)

(52) U.S. Cl.
CPC ........ *B29C 64/393* (2017.08); *G05B 19/4099* (2013.01); *G06F 30/17* (2020.01);
(Continued)

(58) Field of Classification Search
CPC .............. B29C 64/393; G05B 19/4099; G05B 2219/49007; G05B 2219/49023;
(Continued)

(56) References Cited

U.S. PATENT DOCUMENTS 8,903,533 B2  12/2014  Eggers et al.
9,458,620 B2  10/2016  Sevtsuk et al.
(Continued)

FOREIGN PATENT DOCUMENTS

TW    I652590 B       3/2019
WO    2018147887      8/2018
(Continued)

OTHER PUBLICATIONS

Gonella, S. "Homogenization and Bridging Multi-Scale Methods for the Dynamic Analysis of Periodic Solids" [Thesis] School of Aerospace Engineering, Goergia Institute of Technology [retrieved on Jun. 4, 2022] (Year: 2007).*
(Continued)

*Primary Examiner* — Rehana Perveen
*Assistant Examiner* — Alfred H B Wechselberger
(74) *Attorney, Agent, or Firm* — Caldwell Intellectual Property Law

(57) ABSTRACT

A method of generating a three-dimensional product having a cubic internal structure in a process controlled by a computing device. The method comprises receiving a manufacturing request datum from a user client device, wherein the manufacturing request datum further comprises at least an element of a product definition. The method further comprises defining a lattice volume of the manufacturing request datum, wherein defining the at least a lattice volume further comprises defining at least a lattice cell, wherein the at least a lattice cell is comprised within the lattice volume. The method further comprises determining a response characteristic of each lattice cell of the plurality of lattice cells, wherein determining a response characteristic further comprises simulating the application of at least a force on at least a part of the manufacturing request datum as a function of
(Continued)

the product definition. The method further comprises selecting a unit structure.

18 Claims, 6 Drawing Sheets

(51) Int. Cl.
*G05B 19/4099* (2006.01)
*G06F 119/14* (2020.01)
*B33Y 50/02* (2015.01)

(52) U.S. Cl.
CPC ..... *B33Y 50/02* (2014.12); *G05B 2219/49007* (2013.01); *G05B 2219/49023* (2013.01); *G06F 2119/14* (2020.01)

(58) Field of Classification Search
CPC ...... G06F 30/17; G06F 2119/14; G06F 30/12; B33Y 50/02; B33Y 80/00; Y02P 10/25; B22F 10/85; B22F 10/00; B22F 3/00
See application file for complete search history.

(56) References Cited

U.S. PATENT DOCUMENTS

| | | | |
|---|---|---|---|
| 9,789,651 | B2 | 10/2017 | Musuvathy et al. |
| 9,902,114 | B2 | 2/2018 | Musuvathy |
| 10,216,172 | B2 | 2/2019 | Arisoy et al. |
| 10,274,935 | B2 | 4/2019 | Vernon |
| 10,363,703 | B2 | 7/2019 | Banadyga et al. |
| 2017/0228474 | A1 | 8/2017 | Benjamin et al. |
| 2017/0274583 | A1 | 9/2017 | Vernon et al. |
| 2018/0297291 | A1 | 10/2018 | Wighton et al. |
| 2018/0365342 | A1 | 12/2018 | Musuvathy |
| 2019/0079492 | A1 | 3/2019 | Bowden, Jr. et al. |
| 2019/0138670 | A1 | 5/2019 | Bandara et al. |
| 2019/0205499 | A1 | 7/2019 | De Lange et al. |
| 2019/0347376 | A1* | 11/2019 | Stoddart ............... G06F 30/23 |
| 2020/0150623 | A1* | 5/2020 | Bandara ............... B33Y 10/00 |

FOREIGN PATENT DOCUMENTS

| | | | | |
|---|---|---|---|---|
| WO | WO2020/056405 | * | 3/2019 | ............ G16C 60/00 |
| WO | WO2020056405 | * | 3/2020 | ............ G16C 60/00 |

OTHER PUBLICATIONS

Box, C. "Analysis of Additively Manufactured Lattice Structures Using Finite Element Methods" [Thesis] AFIT-ENY-MS-17-M-245, Air Force Institute of Technology [retrieved on Jun. 1, 2022] (Year: 2017).*
Ma et al. "Structural topology and shape optimization for a frequency response problem" Computational Mechanics (1993) vol. 13, pp. 157-174 [retrieved on Jun. 2, 2022] (Year: 1993).*
Wang et al. "Natural frequency optimization of 3D printed variable-density honeycomb structure via a homogenization-based approach" Additive Manufacturing vol. 20 (2018) pp. 189-198 [retrieved on Jun. 1, 2022] (Year: 2018).*
Thompson et al. "Design for Additive Manufacturing: Trends, opportunities, considerations, and constraints" CIRP Annals—Manufacturing Technology, vol. 65 (2016) pp. 737-760 [retrieved on Jun. 2, 2022] (Year: 2016).*
Chen et al. "A nonlocal lattice particle model for fracture simulation of anisotropic materials" Composites Part B, vol. 90, pp. 141-151 (Year: 2016).*
Chen et al. "A generalized 2D non-local lattice spring model for fracture simulation" Computational Mechanics, vol. 54, pp. 1541-1558; DOI:10.1007/s00466-014-1075-4 (Year: 2014).*
Sillig et al. "Crack nucleation in a peridynamic solid" International Journal Fracture, vol. 162, pp. 219-227; DOI:10.1007/s10704-010-9447-z (Year: 2010).*
http://www.withinlab.com/software/new_index.php.
https://ntopology.com/resources/manual/lattice-tools/.
https://arxiv.org/pdf/1905.02902.pdf.
https://www.jstage.jst.go.jp/article/jamdsm/13/3/13_2019jamdsm0057/_pdf.

* cited by examiner

METHODS AND SYSTEMS FOR GENERATING A THREE-DIMENSIONAL PRODUCT HAVING A CUBIC INTERNAL STRUCTURE

FIELD OF THE INVENTION

The present invention generally relates to the field of production of objects utilizing additive manufacturing processes. In particular, the present invention is directed to methods and systems for generating a three-dimensional product having a cubic internal structure.

BACKGROUND

Lattice structures can be created using additive manufacturing processes. These structures typically result in lighter-weight, more efficient designs. However, not all lattices can be produced using additive manufacturing processes, due to design-for-manufacturability constraints. Design-for-manufacturability constraints include the time required to machine the product, set-up time of the computer numeric control machine, material type, geometric tolerance, volume of the material to be machined, and the like. Additionally, design-for-manufacturability constraints may include constraints on overhangs and free spans, minimum angels, and minimum section thickness. Specific configurations of lattices are preferable to other configurations, due to improved mechanical properties such as static and dynamic stiffnesses, and strength-to-mass ratio, improved surface area to volume ratios and beneficial microturbulence characteristics. Unfortunately, selection of an appropriate lattice for a given process has proved difficult to achieve efficiently, if at all.

SUMMARY OF THE DISCLOSURE

In an aspect a method of generating a three-dimensional product having a cubic internal structure in a process controlled by a computing device, the method of generating a three-dimensional product comprising receiving a manufacturing request datum from a user client device, wherein the manufacturing request datum further comprises at least an element of a product definition. The method further comprises defining a lattice volume of the manufacturing request datum, wherein defining the at least a lattice volume further comprises defining at least a lattice cell, wherein the at least a lattice cell is comprised within the lattice volume. The method further comprises determining a response characteristic of each lattice cell of the plurality of lattice cells, wherein determining a response characteristic further comprises simulating the application of at least a force on at least a part of the manufacturing request datum as a function of the product definition. The method further comprises selecting a unit structure, wherein selecting the unit structure further comprises generating a first loss function as a function of a geometric datum of the lattice cell and the response characteristic and minimizing the first loss function.

In another aspect a system for generating a three-dimensional product having a cubic internal structure in a process controlled by a computing device, the system for generating a three-dimensional product is designed and configured to receive a manufacturing datum from a user client device, wherein the manufacturing request datum further comprises at least an element of a product definition. The system is further designed and configured to define, at a dimensional module, a lattice volume of the manufacturing request datum, wherein defining the at least a lattice volume is further designed and configured to define at least a lattice cell, wherein the at least a lattice cell is comprised within the lattice volume. The system is further designed and configured to determine, at a simulation module, a response characteristic of each lattice cell of the plurality of lattice cells, wherein determining a response characteristic is further designed and configured to simulate the application of at least a force on at least a part of the manufacturing request datum as a function of the product definition. The method is further designed and configured to select, at the simulation module, a unit structure, wherein selecting the unit structure is further designed and configured to generate a first loss function as a function of a geometric datum of the lattice cell and the response characteristic and minimize, at the simulation module, the first loss function.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
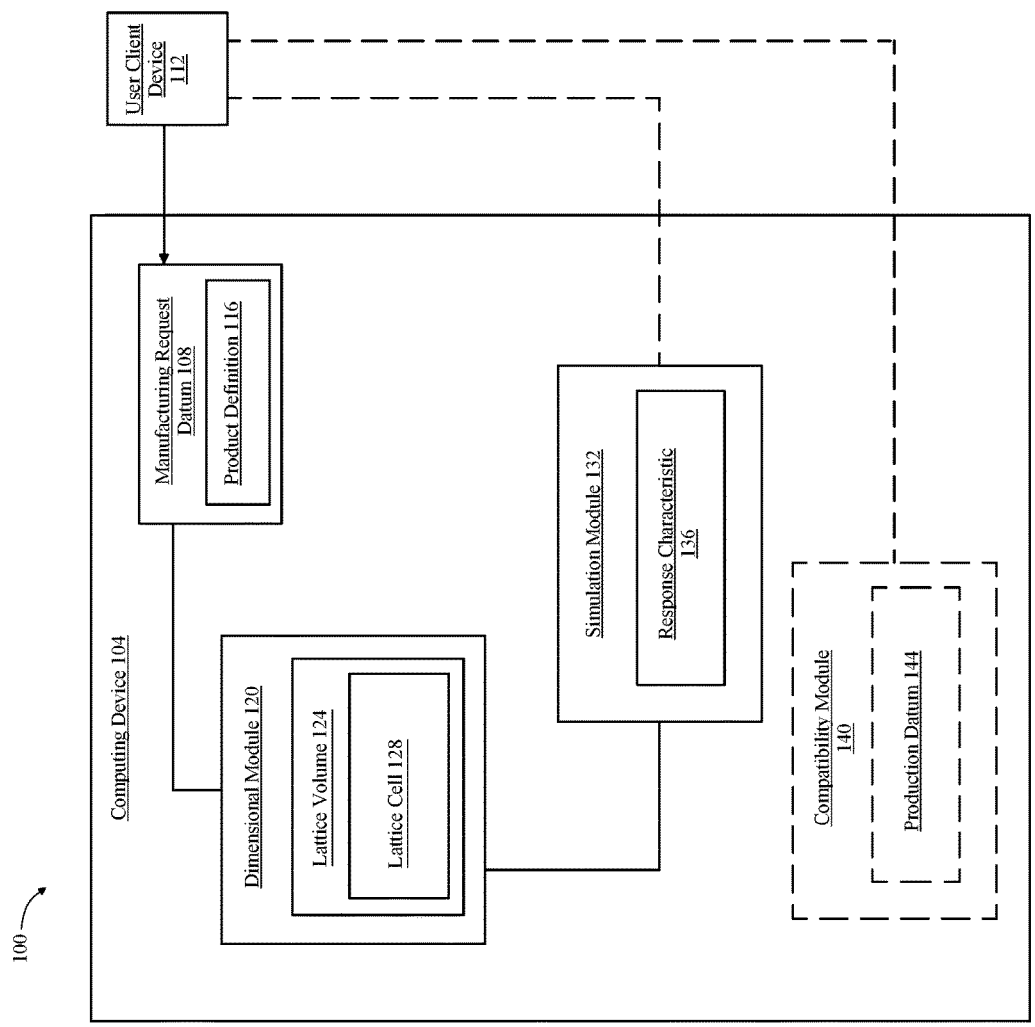
FIG. 1 is a high-level block diagram illustrating an embodiment of a system for generating a three-dimensional product having a cubic internal structure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a three-dimensional product having a cubic internal structure. A lattice volume of the three-dimensional product may be generated with a lattice cell preferable to others due to an increased dynamic stiffness datum and an increased strength-to-mass datum. The lattice cell which is most preferred is generated by simulating application of various static forces, and of time-varying patterns of force vectors to each lattice cell of the plurality of lattice cells and evaluating how each lattice cell of the plurality of lattice cells respond to the static forces and time-varying forces. In an embodiment, a manufacturing request datum, a mesh manufacturing request datum, or both may be additively manufactured.

Embodiments of the present system and method include the performance of manufacturing processes. In some embodiments, a manufacturing process is a process used to form a product, which may be an end-product, or a part used to assemble an end-product, by the performance of one or more manufacturing steps. As used herein, a mesh manufacturing request datum is an object that will become a product when the one or more manufacturing steps been performed. One or more steps in the production of product may include physical modifications to mesh manufacturing request datum or programming and modeling steps used to perform the modifications, such as modeling the mesh manufacturing request datum or product, or computing toolpaths or other algorithms for the product's manufacture.

One or more steps may include an additive manufacturing process, in which material is deposited on the mesh manufacturing request datum. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material.

Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Referring now to FIG. 1, a block diagram of system 100 for generating a three-dimensional product having a cubic internal structure. As described herein, a cubic internal structure is any structure comprised of lattice cells, wherein the cubic internal structure may include a cubic structure and/or any non-cubic structure. System 100 is configured to determine a response characteristic of each lattice cell of the plurality of lattice cells and can include computing device 104, user client device 112, manufacturing request datum 108, product definition 116, dimensional module 120, lattice volume 124, lattice cell 128, simulation module 132, response characteristic 136, compatibility module 140, production datum 144, and any combination thereof.

Still referring to FIG. 1, system 100 is designed and configured to include computing device 104. Computing device 104 may include any computing device as described herein, including without limitation, a microcontroller, microprocessor, digital signal processor (DSP) and/or system on a chip (SoC) as described herein. Computing device may include, be included in, and/or communicate with a mobile device such as a mobile telephone or smartphone. Computing device may include, be included in, and/or communicate with an automated manufacturing device, such as an additive manufacturing device, subtractive manufacturing device, injection molding device, and the like. Computing device 104 may include a single computing device operating independently, or may include two or more computing device operating in concert, in parallel, sequentially or the like; two or more computing devices may be included together in a single computing device or in two or more computing devices. Computing device 104 with one or more additional devices as described below in further detail via a network interface device. Network interface device may be utilized for connecting a computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device 104 or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 is configured to receive a manufacturing request datum 108 from a user client device 112. The manufacturing request datum 108 further comprises at least an element of a product definition 116. A "manufacturing request datum" 108 as used in this disclosure is any data describing and/or relating to a computer model of a part to be manufactured. The part may be manufactured by any additive manufacturing process as described herein. For example and without limitation, a part may include parts used as production parts, functional models, visual aids, fit and assembly testing, tooling patterns and components, jigs and fixtures, concept models, patterns for casting, and the like. A computer model, as described herein, is a digital model of a physical structure as created using computer-aided design (CAD) modeling software. For example and without limitation, computer-aided design (CAD) software may include SOLIDWORKS® software and/or CATIA software (available from Dassault Systémes SolidWorks Corp, Waltham, Massachusetts), AUTOCAD® software and/or Fusion 360 software (available from Autodesk, Inc., San Rafael, California), PTC Creo software (available from PTC, Inc., Boston, Massachusetts), Siemens NX software (available from Siemens PLM Software, Plano, Texas) and MICROSTATION® software (available from Bentley Systems, Inc., Exton, Pennsylvania), and the like. The computer model may include any modeling type, such as, without limitation, a wireframe, solid model and/or any combination thereof. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. The computer model further includes information about the geometry and/or other defining properties of the mechanical part's structure.

Continuing to refer to FIG. 1, manufacturing request datum 108 includes at least an element of the product definition 116. A "product definition" as used in this disclosure is a descriptive attribute describing the forces expected to be experienced by a completed part, wherein a completed part is the manufactured part of the part included in the manufacturing request datum 108. Descriptive attributes, as used herein, are any features, limitations, data, details, restrictions and/or specifications of the manufacturing request datum 108. Descriptive attributes may include, without limitation, any features, limitations, data, details, restrictions and/or specifications of the part geometry, materials, finishes, connections, hardware, special manufacturing processes, dimensions, tolerances, uses, and the like, that may be impacted by forces the part may experience after completion of the manufacturing process. As an example and without limitation, product definition 116 may include a maximum strength the material must withstand before failure as a result of the application of the part after completion of the manufacturing process, such as a requirement for a material with an ultimate tensile strength of greater than 400 MPa. As a further example and without limitation, product definition 116 may include any detail describing that the completed part will experience a transverse load, such as a force applied perpendicular to the longitudinal axis of the part. As another example and without limitation, product definition 116 may include any detail describing that the completed part will experience an axial load, such as a force applied collinear with the longitudinal axis of the part. As a further example and without limitation, product definition 116 may include any detail describing that the completed part will experience torsional loading, such as a twisting action resulting from a pair of externally applied equal and oppositely directed force couples acting on parallel planes, or by a single external couple applied to a part that had one end fixed against rotation. As a further non-limiting example, product definition 116 may include a vibrational load the completed part will experience in a particular frequency range, such as a vibrational load of 200 Hz. Persons skilled in the art, upon reviewing the entirety of this disclosure, will be aware of various descriptive attributes which may be suitable for use as the product definition consistently with this disclosure.

With continued reference to FIG. 1, a user client device 112 may include, without limitation, a transmission of communication with at least a computing device 104. Transmission may include any transmission as described herein. For example and without limitation, transmission may include file transfer protocols such as File Transfer Protocol (FTP), Hypertext Transfer Protocol (HTTP), SSH File Transfer Protocol (SFTP), Secure Copy (SCP), Accelerated File Transfer Protocol (AFTP), and the like. A user client device 112 may include an additional computing device, such as a mobile device, laptop, desktop computer, or the like; as a non-limiting example, the user client device 112 may be a computer and/or workstation operated by an engineering professional. Persons skilled in the art, upon reviewing the entirety of this disclosure, will be aware of various devices which may be suitable for use as user client device consistently with this disclosure.

Still referring to FIG. 1, system 100 is configured to include dimensional module 120 operating on computing device 104. Dimensional module 120 may include any hardware and/or software module. Dimensional module 116 is configured to define a lattice volume 124 of manufacturing request datum 108. A "lattice volume," as used in this disclosure, is a total volume of the computer model of the part of manufacturing request datum 108 to be replaced by repeating at least a lattice cell, wherein repeating the at least a lattice cell generates a lattice. The at least a lattice cell may be repeated by translating the lattice cell across the x-axis, y-axis, and z-axis until the outer limits of lattice volume 124 is reached. Dimensional module 116 is further designed and configured to define at least a lattice cell 128, wherein the lattice cell 128 is comprised within lattice volume 124. A "lattice cell" as used in this disclosure is the smallest repeating unit having the full symmetry of lattice volume 124. Lattice cell 128 may show the three-dimensional pattern of the entire lattice volume 124 and from which the entire lattice volume 124 can be built up by repetition in three dimensions. Lattice cell 128 may include a lattice system, such as a triclinic lattice, monoclinic lattice, orthorhombic lattice, tetragonal lattice, rhombohedral lattice, hexagonal lattice, and cubic lattice. For example and without limitation, lattice cell 128 may include any cubic lattice cell and/or non-cubic lattice cell. Persons skilled in the art, upon reviewing the entirety of this disclosure, will be aware of units which may be suitable for use as the at least a lattice cell consistently with this disclosure.

With continued reference to FIG. 1, dimensional module 120 is further designed and configured to define a junction point and define a lattice ligament, wherein the lattice ligament interconnects the junction point. A "junction point" as used in this disclosure is the position in lattice cell 128 in which an atom would occupy, wherein an atom may include material configured in any volume to occupy the space. A "lattice ligament" as used in this disclosure is the linear connection between each junction point within lattice cell 128. For example and without limitation, the at least a lattice cell 128 may include a geometric arrangement, such as primitive, base-centered, body-centered, face-centered. The primitive geometric arrangement, as described herein, includes one junction point in total in lattice cell 128, wherein one-eighth of the junction point is distributed to each corner of lattice cell 128. The base-centered geometric arrangement, as described herein, includes two junction points in total in lattice cell 128, wherein one-eighth of one junction point is distributed to each corner of lattice cell 128 and each half of the other junction point is distributed to the two horizontal faces of lattice cell 128. The body-centered geometric arrangement, as described herein, includes two junction points in total in lattice cell 128, wherein one junction point is located in the center of lattice cell 128 and one-eighth of the other junction point is distributed to each corner of lattice cell 128. The face-centered geometric arrangement, as described herein, includes four junction points in total in lattice cell 128, wherein one-eighth of one junction point is distributed to each corner of lattice cell 128 and half a junction point is distributed to the six faces of lattice cell 128.

Continuing to refer to FIG. 1, system 100 is configured to include simulation module 132 operating on computing device 104. Simulation module 132 may include any hardware and/or software module. Simulation module 132 is designed and configured to determine a response characteristic 136 of each lattice cell 128 of the plurality of lattice cells 128. A "response characteristic" as used in this disclosure is a descriptive attribute indicating how at least a lattice cell 128 responds to an applied force. Descriptive attributes, as used herein, may include any features, limitations, details, data, restrictions and/or specifications of the at least a lattice cell 128 as it responds to an applied force. Persons skilled in the art, upon reviewing the entirety of this disclosure, will be aware of descriptive attributes which may be suitable for use as the response characteristic consistently with this disclosure.

Still referring to FIG. 1, simulation module 132 is further designed and configured to simulate the application of at least a force on at least a part of the manufacturing request datum 108 as a function of the product definition 116. A part of the manufacturing request datum 108 may include a face of the part of the manufacturing request datum 108, a side of the part of the manufacturing request datum 108, an edge of the part of the manufacturing request datum 108, a geometric feature of the part of the manufacturing request datum 108, wherein a geometric feature may include a hole, ridge, groove, extrusion, and the like. The simulation of the application of at least a force on at least a part of the manufacturing request datum 108 as a function of the product definition 116 includes translating the lattice cell 128 across the x-axis, y-axis, and z-axis until the outer limits of lattice volume 124 is reached, wherein the lattice volume 124 is contained with each lattice cell 128 of the plurality of lattice cells 128 repeated. The simulation of the application of at least a force on at least a part of the manufacturing request datum 108 as a function of the product definition 116 further includes simulating the application of a force on the lattice volume 124, wherein the force applied is determined as a result of the product definition 116. The forces may be applied to any surface, area, edge, and/or feature of the part. The forces may be applied in any direction, as specified by a vector. The simulation is used to represent the dynamic responses of the lattice volume 124 to the behavior of applied forces the completed part will experience in application. For example and without limitation, manufacturing request datum 108 includes product definition 116 describing the completed part will experience a tensile load of 200 MN; the simulation will use the product definition 116 to simulate a tensile force of 200 MN on the lattice volume 124, wherein the at least a response characteristic 136 is determined by the response to the tensile force being applied to each lattice cell 128 of the plurality of lattice cells 128 contained within lattice volume 124. For a further example and without limitation, manufacturing request datum 108 includes product definition 116 describing the completed part will experience two normal forces, one normal force is 150 N and the second normal force is 215 N; the simulation will use the product definition to simulate both normal forces at the specified magnitude to each lattice volume 124, wherein the at least a response characteristic 136 is determined by the response to the two normal forces being applied of each lattice cell 128 of the plurality of lattice cells 128 contained within lattice volume 124. As a further example and without limitation, manufacturing request datum 108 includes product definition 116 describing the completed part will experience an applied force of 25 N to each horizontal surface; the simulation will use the product definition 116 to simulate applied forces of 25 N opposite of each other on the horizontal surfaces of the lattice volume 124, wherein the at least a response characteristic 136 is determined by the response to the applied forces being applied to each lattice cell 128 of the plurality of lattice cells 128 contained within lattice volume 124. Persons skilled in the art, upon reviewing the entirety of this disclosure, will be aware of simulations which may be suitable for use as the simulation of the application of a vector value of at least a force on the lattice volume 124 as a function of the product definition 116 consistently with this disclosure.

With continued reference to FIG. 1, in an embodiment, simulation module 132 is further designed and configured to calculate a dynamic stiffness datum for each corresponding lattice cell option of the plurality of corresponding lattice cell options and calculate a strength-to-mass datum for each corresponding lattice cell option of the plurality of corresponding lattice cell options. In an embodiment, simulation module 132 is further designed and configured to select a corresponding lattice cell as a function of the dynamic stiffness datum and the strength-to-mass datum for each corresponding lattice cell option of the plurality of corresponding lattice cells options, wherein selecting the corresponding lattice cell further includes selecting the corresponding lattice cell option with a dynamic stiffness datum within a predetermined range value and selecting the corresponding lattice cell option with the greatest strength-to-mass datum value. The corresponding lattice cell, as described herein, is the lattice cell 128 of the lattice cells within the predetermined range value of dynamic stiffness datums with the greatest strength-to-mass datum value. The dynamic stiffness datum for each lattice cell 128 of the plurality of lattice cells 128, as described herein, is the frequency dependent ratio between a dynamic force and the resulting dynamic displacement, wherein an increase of the dynamic stiffness datum will reduce the resulting dynamic displacement. The predetermined range value for the dynamic stiffness datum is determined as a function of the vibrational frequency the completed part will encounter in application. For example and without limitation, a completed part that will encounter a large amount of vibration frequency, such as a railroad fastening, should have a reduced dynamic stiffness datum for each lattice cell 128 of the plurality of lattice cells 128 to reduce the noise and vibrations generated from the vibrational frequency by providing effective isolation of the structure from lower frequencies. The predetermined range value for the dynamic stiffness datum is determined in accordance with ISO 9052-1:1989. The strength-to-mass datum for each lattice cell 128 of the plurality of lattice cells 128, as described herein, is the force per unit area at failure divided by the density of lattice volume 124. The greater the strength-to-mass datum for each lattice cell 128 of the plurality of lattice cells 128 the greater the strength of the lattice cell 128 and the lighter weight the lattice cell 128 is.

Still referring to FIG. 1, in an embodiment, simulation module 132 is further designed and configured to apply a time-varying force to each lattice cell of the plurality of lattice cells, wherein the time-varying force vary in a pattern characteristic of a specific frequency. In an embodiment, simulation module 132 is further designed and configured to identify the frequency associated with a shortest mean-time-before-failure. The mean time-before-failure, as described herein, is the length of time the completed part is expected to function in an application until failure, wherein the application is determined as a function of the product definition 116. Failure, as described herein, is the when the completed product can no longer produce the desired result.

Continuing to refer to FIG. 1, in an embodiment, simulation module 132 is further designed and configured to apply a load with a constant amplitude to each lattice cell of the plurality of lattice cells until failure of the three-dimensional product. In an embodiment, simulation module 132 is further designed and configured to determine the number of loading cycles applied before each lattice cell of the plurality of lattice cells reaches failure. Failure may include any failure as described in the entirety of this disclosure. The applied load, as described herein, may include a cyclic stress, force, strainor displacement. The applied load may further include a mean stress, force, strain or displacement on a sinusoidal cycle, such as an alternating stress, force, strain, or displacement. The applied load may further include any stress, force, strain or displacement as described in the entirety of this disclosure. The load cycle, as described herein, is the duration from the application of one stress, force, strain or displacement to the application of the next stress.

Still referring to FIG. 1, in an embodiment, simulation module 132 is further designed and configured to apply a load to each lattice cell of the plurality of lattice cells, wherein the load may be static or dynamic. The load may further include a load applied normal to the direction of a plane of the lattice cell, applied along the length of a plane of the lattice cell, applied across the width of a plane of the lattice cell, and the like. In an embodiment, simulation module 132 is further designed and configured to identify crack nucleation, crack growth and final fracture in each lattice cell of the plurality of lattice cells. The crack nucleation as described herein, is when microcracks form due to sufficient local stress levels. The separation of material may be defined by a predetermined threshold of distance between crack faces or crack length. Crack growth, as described herein, is any crack nucleation where crack faces and or opening increases as a result of the applied load. Final failure due to fracture, as described herein, is when the crack nucleation increases to become a dominant flaw and increases without bound, as a result of the applied load, that results failure, wherein in the product no longer able to produce the desired result.

With continued reference to FIG. 1, simulation module 132 is further designed and configured to select a unit structure by generating a first loss function as a function of a geometric datum of the lattice cell 128 and the response characteristic 136 and minimizing the first loss function. A unit structure, as described herein, is the lattice cell 128 determined to be the optimal lattice cell 128. Simulation module 132 operating on computing device 104 may compare each lattice cell 128 of the plurality of lattice cells 128 and the response characteristic 136 to a mathematical expression representing an optimal combination of at least a geometric datum. A "geometric datum" as used in this disclosure is a specification, dimension, location, and/or data describing a feature of the lattice cell 128. The at least a geometric datum may be user entered utilizing user client device 112, wherein the user client device may include any user client device as described herein. The geometric datum may include a dimension of the lattice cell 128, an orientation of the lattice cell 128, a dimension of the lattice ligament, a position of the lattice ligament, a dimension of the junction point, a position of the junction point, and a dimension of a void space of the lattice cell 128. The void space of a lattice cell 128 is determined by the atomic packing factor of each lattice cell 128 of the plurality of lattice cells 128, wherein the atomic packing factor is the fraction of volume in the lattice cell 128 that is occupied. Mathematical expression may include a linear combination of variables, weighted by coefficients representing relative importance of each variable in generating a completed part utilizing additive manufacturing, as described herein. For instance, a variable such as an orientation of the lattice cell 128 may be multiplied by a first coefficient representing the importance of the orientation of the lattice cell 128, a second variable such as the dimension of the lattice ligament may be multiplied by a second coefficient representing the importance of a dimensional constraint of the lattice ligament, a position of the junction point and the dimension of a void space of the lattice cell 128 may be represented as another parameter, which may be multiplied by an additional coefficient representing an importance of that variable; persons skilled in the art, upon reviewing the entirety of this disclosure, will be aware of the different variables that may be weighted by various coefficients. Use of a linear combination is provided only as an illustrative example; other mathematical expressions may alternatively or additionally be used, including without limitation higher-order polynomial expressions or the like.

Still referring to FIG. 1, mathematical expression may represent a loss function, where a "loss function" is an expression of an output of which an optimization algorithm minimizes to generate an optimal result. As a non-limiting example, simulation module 132 may calculate variables of each of a plurality of lattice cells 128, calculate an output of mathematical expression using the variables, and select a unit structure that produces an output having the lowest size, according to a given definition of "size" of the set of outputs representing each lattice cell 128 of the plurality of lattice cells 128; size may, for instance, include absolute value, numerical size, or the like. Selection of different loss functions may result in identification of a different lattice cell 128 as generating minimal outputs; for instance, where a position of the lattice ligament is associated in a first loss function with a large coefficient or weight, a position of the lattice ligament having a smaller value on the x-axis, y-axis, and/or z-axis may minimize the first loss function, whereas a second loss function wherein position of the lattice ligament has a smaller coefficient but position of the junction point has a larger coefficient may produce a minimal output for a different lattice cell 128 and having a greater position of the lattice ligament but having a smaller position of the junction point.

Alternatively or additionally, and still referring to FIG. 1, each lattice cell 128 of the plurality of lattice cells 128 may be represented by a mathematical expression having the same form as mathematical expression; simulation module 132 may compare the former to the latter using an error function representing average difference between the two mathematical expressions. Error function may, as a non-limiting example, be calculated using the average difference between coefficients corresponding to each variable. A lattice cell 128 having a mathematical expression minimizing the error function may be selected, as representing an optimal expression of relative importance of variables to a system or user. In an embodiment, error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of mathematical expression and/or loss function may be scaled and/or normalized; this may permit comparison and/or error function calculation to be performed without skewing by varied absolute quantities of numbers.

Still referring to FIG. 1, mathematical expression and/or loss function may be provided by receiving one or more user commands. For instance, and without limitation, a graphical user interface may be provided to user with a set of sliders or other user inputs permitting a user to indicate relative and/or absolute importance of each variable to the user. Sliders or other inputs may be initialized prior to user entry as equal or may be set to default values based on results of any machine-learning processes or combinations thereof as described in further detail below.

With continued reference to FIG. 1, mathematical expression and/or loss function may be generated using a machine learning to produce loss function: i.e., regression. Mathematical expression and/or loss function be user-specific, using a training set composed of past user selections; may be updated continuously. Mathematical expression and/or loss function may initially be seeded using one or more user entries as above. User may enter a new command changing mathematical expression, and then subsequent user selections may be used to generate a new training set to modify the new expression.

Continuing to refer to FIG. 1, in an embodiment, system 100 is designed and configured to include compatibility module 140 operating on computing device 104. Compatibility module 140 may include any hardware and/or software module. Compatibility module 140 is designed and configured to receive a production datum 144 from user client device 112. A "production datum" as used in this disclosure is any element of data describing an attribute, constraint, specification, and/or detail of the manufacturing process to additively manufacture manufacturing request datum 108, wherein additive manufacturing may include any additive manufacturing process as described I the entirety of this disclosure. An element of data describing an attribute, constraint, specification, and/or detail of the manufacturing process includes an operational time datum, such as the time to manufacture manufacturing request datum 108, a material datum, such as the material used to manufacture the completed part, a material form datum, such as the process to get a material from the raw form to a usable material for manufacturing, a tool count datum, such as the different manufacturing techniques required to manufacture the completed part, and a part face count datum, such as the total number of faces on the part to be manufactured. Persons skilled in the art, upon reviewing the entirety of this disclosure, will be aware of elements of data which may be suitable for use as a production datum consistently with this disclosure.

Still referring to FIG. 1, compatibility module 140 is further designed and configured to select a compatible lattice cell by generating a second loss function as a function of the production datum 144 of manufacturing request datum 108 or any portion thereof and a production total and minimizing the second loss function. The compatible lattice cell, as described herein, is the lattice cell 128 of the lattice cells 128 compatible with production datum 144 with the lowest value of production total. A "production total" as used in this disclosure is the total cost to manufacture the part included in the manufacturing request datum 108 including each lattice cell 128 of the plurality of lattice cells 128 in each lattice volume 124. Compatibility module 140 operating on computing device 104 may compare each lattice cell 128 of the plurality of lattice cells 128 and the production total to a mathematical expression representing an optimal combination of the production datum 144. The production datum 144 may be user entered utilizing user client device 112, wherein the user client device may include any user client device as described herein. Mathematical expression may include a linear combination of variables, weighted by coefficients representing relative importance of each variable in generating a completed part utilizing additive manufacturing, as described herein. For instance, a variable such as an material datum of the lattice cell 128 may be multiplied by a first coefficient representing the importance of the material datum of the lattice cell 128, a second variable such as the operational time datum of the lattice cell 128 may be multiplied by a second coefficient representing the importance of a shorter operational time datum of the lattice cell 128, a material form datum and the part face count datum of the lattice cell 128 may be represented as another parameter, which may be multiplied by an additional coefficient representing an importance of that variable; persons skilled in the art, upon reviewing the entirety of this disclosure, will be aware of the different variables that may be weighted by various coefficients. Use of a linear combination is provided only as an illustrative example; other mathematical expressions may alternatively or additionally be used, including without limitation higher-order polynomial expressions or the like.

Still referring to FIG. 1, mathematical expression may represent a loss function, where a "loss function" includes any loss function as described in the entirety of this disclosure. As a non-limiting example, compatibility module 140 may calculate variables of each of a plurality of lattice cells 128, calculate an output of mathematical expression using the variables, and select the compatible lattice cell that produces an output having the lowest size, according to a given definition of "size" of the set of outputs representing each lattice cell 128 of the plurality of lattice cells 128; size may, for instance, include absolute value, numerical size, or the like. Selection of different loss functions may result in identification of a different lattice cell 128 as generating minimal outputs; for instance, where a material datum is associated in a first loss function with a large coefficient or weight, a material datum having a smaller production total will minimize the first loss function, whereas a second loss function wherein a material datum has a smaller coefficient but the operational time datum has a larger coefficient may produce a minimal output for a different lattice cell 128 and having a greater production total for the material datum but having a smaller production total for the operational time datum.

Alternatively or additionally, and still referring to FIG. 1, each lattice cell 128 of the plurality of lattice cells 128 may be represented by a mathematical expression having the same form as mathematical expression; compatibility module 140 may compare the former to the latter using an error function representing average difference between the two mathematical expressions. Error function may include any error function as described in the entirety of this disclosure. Mathematical expression and/or loss function may be provided by receiving one or more user commands, as described in further detail in the entirety of this disclosure. Mathematical expression and/or loss function may be generated using any methods and/or combination of methods as described in further detail throughout the entirety of this disclosure.

With continued reference to FIG. 1, in an embodiment, system 100 is further configured to generate a mesh manufacturing datum as a function of the loss function and display the mesh manufacturing datum to the user client device 112. A "mesh manufacturing datum" as used in this disclosure is a computer model of a part included in manufacturing request datum 108, wherein the computer model of the part includes lattice volume 124 contained with repeated translations of the corresponding lattice cell. The mesh manufacturing datum may further include the computer model of the part included in the manufacturing request datum 108, wherein the computer model of the part includes lattice volume 124 contained with repeated translations of the compatible lattice cell. Repeated translation is the translation of the lattice cell across the x-axis, y-axis and z-axis until the total volume of lattice volume 124 is occupied by a lattice cell. Generating the mesh manufacturing request datum may include the integration of the translation of the corresponding lattice cell in lattice volume 124 of the part of manufacturing request datum 108. Generating the mesh manufacturing request datum may include the integration of the translation of the compatible lattice cell in lattice volume 124 of the part of manufacturing request datum 108. The mesh manufacturing datum is displayed to a user client device 112; display may include any display as described in this disclosure. Display, for example and without limitation, may include displaying the mesh manufacturing datum to a user client device 112 utilizing a graphical user interface (GUI). A GUI may include without limitation, a graphical element having display capabilities, wherein a user may view the mesh manufacturing datum. Persons skilled in the art, upon reviewing the entirety of this disclosure, will be aware of computer models which may be suitable for use as the mesh manufacturing datum consistently with this disclosure.

Figure 2:
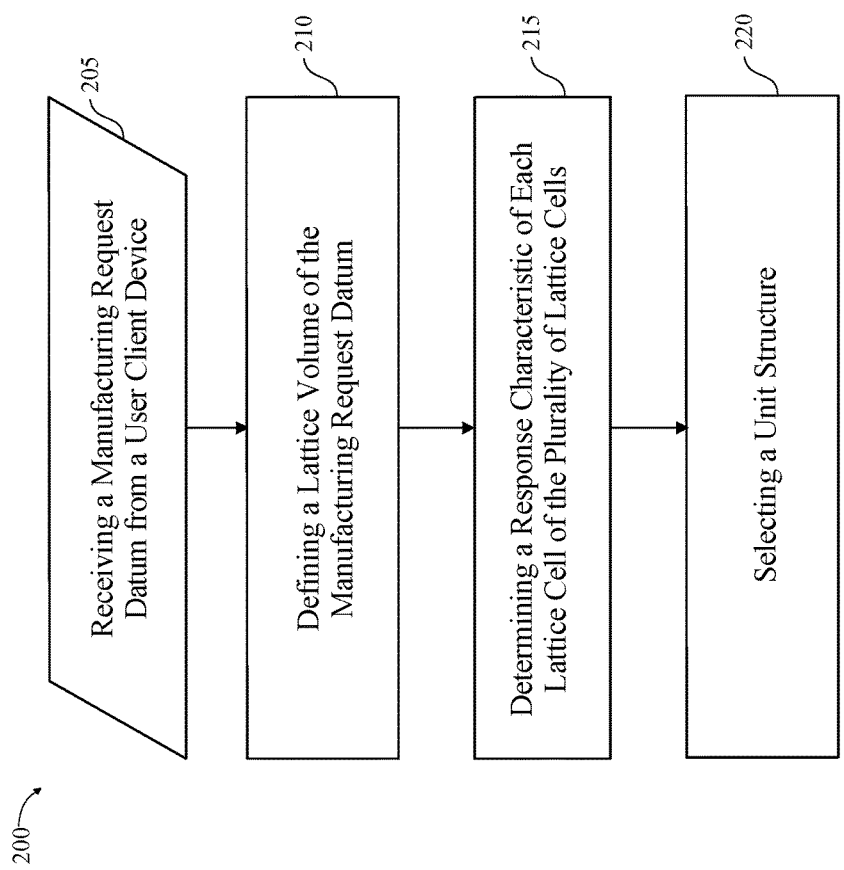
FIG. 2 illustrates a process flow diagram illustrating an embodiment of a method for generating a three-dimensional product having a cubic internal structure.

Referring now to FIG. 2, an embodiment of a method 200 for generating a three-dimensional product having a cubic internal structure is illustrated. At step 205, system 100 operating on computing device 104 receives a manufacturing request datum 108 from a user client device 112. Manufacturing request datum 108 further comprises a product definition 116. Manufacturing request datum 108 may be received by system 100 utilizing any network methodology and/or any combination of steps of network methodology as described herein. Manufacturing request datum 108 includes any data describing and/or relating to a computer model of a part to be manufactured, wherein the part may be manufactured by any additive manufacturing process, as described above in further detail in reference to FIG. 1. The computer model may include any computer model as described in the entirety of this disclosure. Product definition 116 includes any descriptive attributes describing the forces expected to be experienced by a completed part, wherein a completed part is the manufactured part of the part included in the manufacturing request datum 108, as described above in reference to FIG. 1. Descriptive attributes, as described above in further detail, are any features, limitations, data, details, restrictions and/or specifications of the manufacturing request datum 108. As an example and without limitation, product definition 116 may include a minimum elasticity the material must withstand as a result of the application of the part after completion of the manufacturing process, such as a requirement for a material with a Young's modulus of less than 4 GPa. As a further example and without limitation, product definition 116 may include any detail describing that the completed part will experience a transverse load, such as a force applied perpendicular to the longitudinal axis of the part. As another example and without limitation, product definition 116 may include any detail describing that the completed part will experience an axial load, such as a 40 N force applied collinear with the longitudinal axis of the part. As a further example and without limitation, product definition 116 may include any detail describing that the completed part will experience torsional loading, such as a twisting action resulting from a pair of externally applied equal and oppositely directed force couples acting on parallel planes, or by a single external couple applied to a part that had one end fixed against rotation. As a further non-limiting example, product definition 116 may include a vibrational load the completed part will experience in a particular frequency range, such as a vibrational load of 150 Hz. Further non-limiting examples of product definition 116 are described in detail above in reference to FIG. 1. In an embodiment, manufacturing request datum 108 and/or product definition 116 may be received from a user client device 112 at any step of any method as described in the entirety of this disclosure; for instance when generating a mesh manufacturing request datum.

Still referring to FIG. 2, at step 210, system 100, at dimensional module 120, defines a lattice volume 124 of manufacturing request datum 108. Defining a lattice volume 124 further comprises defining, at dimensional module 120, the at least a lattice cell 128, wherein the at least a lattice cell 128 is comprised within the lattice volume 124. Lattice volume 124 is the total volume of the computer model of the part of manufacturing request datum 108 to be replaced by repeating at least a lattice cell 124, wherein repeating the at least a lattice cell 124 generates a lattice. Lattice volume 124 is described in further detail above in reference to FIG. 1. Lattice cell 128 is the smallest repeating unit having the full symmetry of lattice volume 124. Lattice cell 128 may include a lattice system, such as a triclinic lattice, monoclinic lattice, orthorhombic lattice, tetragonal lattice, rhombohedral lattice, hexagonal lattice, and cubic lattice. A "lattice system" as used in this disclosure is an infinite array of discrete points in three-dimensional space generated by a set of discrete translation operations, wherein the discrete points are atoms, ions, or polymer strings of solid matter. The at least a lattice cell is described in further detail above in reference to FIG. 1.

With continued reference to FIG. 2, defining the at least a lattice cell 128, at dimensional module 120, further comprises defining a junction point. Defining the at least a lattice cell 128, at dimensional module 120, further comprises defining a lattice ligament, wherein the lattice ligament interconnects the junction point. A junction point is the position in lattice cell 128 in which an atom would occupy, wherein an atom may include a polymer string, solid matter and/or any combination thereof. A lattice ligament is the linear connection between each junction point within lattice cell 128, wherein the linear connection may consist of a polymer string, solid matter and/or any combination thereof. For example and without limitation, the at least a lattice cell 128 may include a geometric arrangement, such as primitive, base-centered, body-centered, face-centered. The primitive geometric arrangement, as described above in further detail in reference to FIG. 1, includes one junction point in total in lattice cell 128, wherein the atomic packing factor, the volume of junction points in the lattice cell 128 over the total volume of the lattice cell, is 0.52. The body-centered geometric arrangement, as described above in further detail in reference to FIG. 1, includes two junction points in total in lattice cell 128, wherein the atomic packing factor for the body-centered geometric arrangement is 0.68. The face-centered geometric arrangement, as described above in further detail in reference to FIG. 1, includes four junction points in total in lattice cell 128, wherein the atomic packing factor for the face-centered geometric arrangement is 0.74.

Still referring to FIG. 2, at step 215, system 100 operating on computing device 104 further comprises determining, at simulation module 132, a response characteristic of each lattice cell 128 of the plurality of lattice cells 128. Response characteristic 136, as described above in further detail in reference to FIG. 1, is any descriptive attribute of how the at least a lattice cell 128 responds to an applied force. Descriptive attributes are any features, limitations, details, data, restrictions and/or specifications of the at least a lattice cell 128 as it responds to an applied force. The applied force may include any push or pull acting upon the part as a result of its interaction with another object, wherein the applied force may include contact forces and non-contact forces. The applied force may include any combination of forces as described above in reference to FIG. 1.

Continuing to refer to FIG. 2, at step 220, system 100, operating on computing device 104, further comprises selecting, at simulation module 132, a unit structure. Selecting the unit structure may be performed using any of the methodologies described above in reference to FIG. 1. A unit structure, as described in further detail above in reference to FIG. 1, is the lattice cell 128 determined to be the optimal lattice cell 128 as a function of the first loss function. Selecting a unit structure may include generating a first loss function as a function of a geometric datum of the lattice cell 128 and the response characteristic 136 and minimizing the first loss function. Loss function may include any of the loss functions as described above in reference to FIG. 1. Simulation module 132 operating on computing device 104 may compare each lattice cell 128 of the plurality of lattice cells 128 and the response characteristic 136 to a mathematical expression representing an optimal combination of at least a geometric datum. The at least a geometric datum may be user entered utilizing user client device 112, wherein the user client device may include any user client device as described herein. The at least a geometric datum may further be received by simulation module 132 operating on system 100. The geometric datum may include a dimension of the lattice cell 128, an orientation of the lattice cell 128, a dimension of the lattice ligament, a position of the lattice ligament, a dimension of the junction point, a position of the junction point, and a dimension of a void space of the lattice cell 128. The void space of a lattice cell 128 is determined by the atomic packing factor of each lattice cell 128 of the plurality of lattice cells 128, wherein the atomic packing factor is the fraction of volume in the lattice cell 128 that is occupied. Mathematical expression may include a linear combination of variables, weighted by coefficients representing relative importance of each variable in generating a completed part utilizing additive manufacturing, as described in further detail above in reference to FIG. 1. Mathematical expression and/or loss function may be provided by receiving one or more user commands, as described in further detail in the entirety of this disclosure. Mathematical expression and/or loss function may be generated using any methods and/or combination of methods as described in further detail throughout the entirety of this disclosure.

Figure 3:
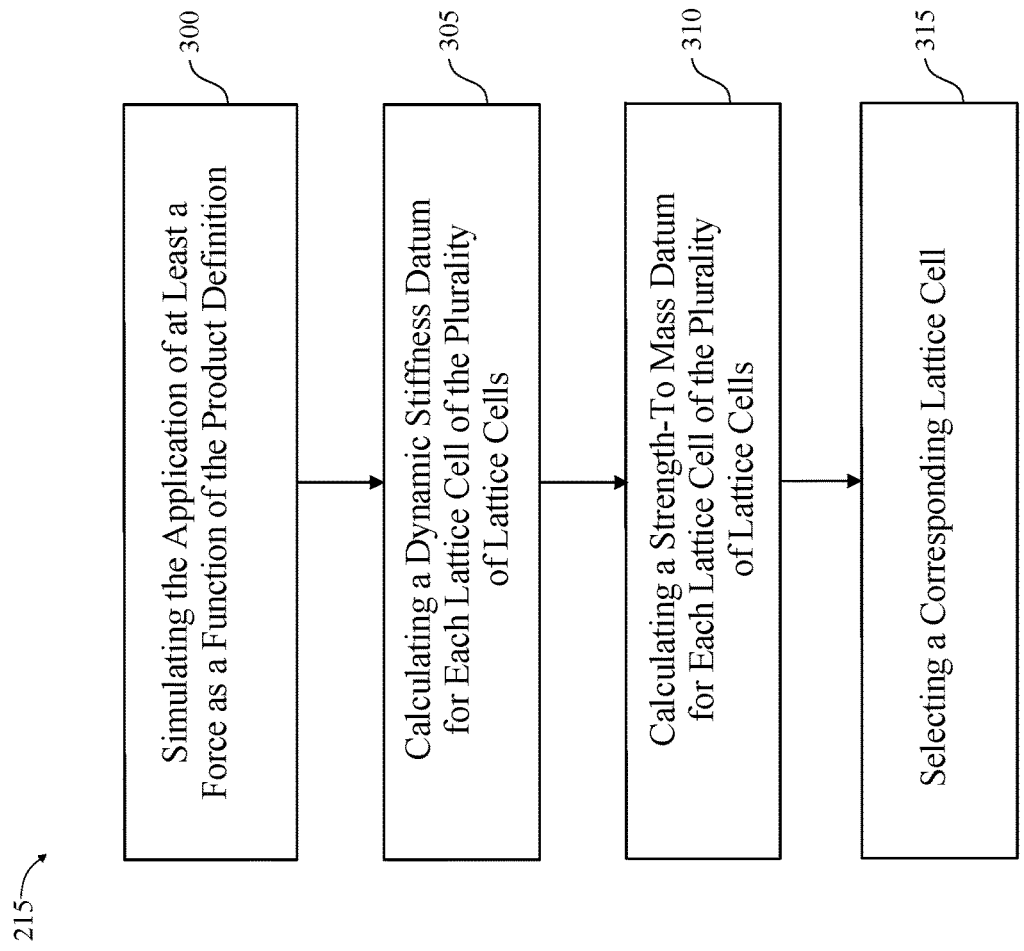
FIG. 3 is a process flow diagram illustrating an embodiment of determining a response characteristic of each lattice cell of the plurality of lattice cells.

Referring now to FIG. 3, an exemplary embodiment of a step 215 of method 200 for determining, at a simulation module 132, the response characteristic 136 of each lattice cell 128 of the plurality of lattice cells 128. At step 300, step 215, operating on computing device 104, further comprises simulating, at simulation module 132, the application of at least a force on at least a part to be manufactured as a function of the product definition 116. A part of manufacturing request datum 108 may include any part of manufacturing request datum 108 as described in the entirety of this disclosure. Simulation may include any simulation step and/or any combination thereof as described in the entirety of this disclosure. The simulation the application of at least a force on at least a part of the manufacturing request datum 108 as a function of the product definition 116 includes translating the lattice cell 128 throughout the designated volume of lattice volume 124. Translating the lattice cell 124 throughout lattice volume 124 may include translating the lattice cell 128 across the x-axis, y-axis, and z-axis until the outer limits of lattice volume 124 is reached, wherein contained within the lattice volume 124 is each lattice cell 128 of the plurality of lattice cells 128 repeated. The simulation the application of at least a force on at least a part of the manufacturing request datum 108 as a function of the product definition 116 further includes simulating the application of a force on the lattice volume 124, wherein the force applied is determined as a result of the product definition 116. The forces applied to the manufacturing request datum 108 may include any forces as described in further detail above. The forces applied to the manufacturing request datum 108 may include any combination of forces as described in further detail throughout the entirety of this disclosure. The forces may be applied, for example and without limitation, to any surface, area, edge, and/or feature of the part, as described above in further detail in reference to FIG. 1. The forces may be applied in any direction, as specified by a vector. The simulation is used to represent the dynamic responses of the lattice volume 124 to the behavior of applied forces the completed part will experience in application. For example and without limitation, manufacturing request datum 108 includes product definition 116 describing the completed part will experience a tensile load of 200 MN on an edge and a normal force of 75 N on the vertical surfaces; the simulation will use the product definition 116 to simulate a tensile force of 200 MN on an edge of manufacturing request datum 108 and a normal force of 75 N on each vertical surface of the plurality of vertical surfaces of manufacturing request datum 108, wherein the at least a response characteristic 136 is determined by the response to the combination of tensile force and normal forces being applied to each lattice cell 128 of the plurality of lattice cells 128 contained within lattice volume 124 of manufacturing request datum 108. For a further example and without limitation, manufacturing request datum 108 includes product definition 116 describing the completed part will experience three forces; a normal force of 150 N on one horizontal surface, an applied force of 80 N to a bottom edge, and a frictional force of 55 N on the vertical surfaces; the simulation will use the product definition to simulate a normal force of 150 N on one horizontal surface of manufacturing request datum 108, an applied force of 80 N on the bottom edge of manufacturing request datum 108, and a frictional force of 55 N on the vertical surfaces of manufacturing request datum 108, wherein the at least a response characteristic 136 is determined by the response to the combination of the three forces being applied of each lattice cell 128 of the plurality of lattice cells 128 contained within lattice volume 124 of manufacturing request datum 108. Persons skilled in the art, upon reviewing the entirety of this disclosure, will be aware of simulations which may be suitable for use as the simulation of the application of a vector value of at least a force on the lattice volume 124 as a function of the product definition 116 consistently with this disclosure.

With continued reference to FIG. 3, at step 305, step 215 of method 200 further comprises calculating, at simulation module 132, a dynamic stiffness datum for each lattice cell 128 of the plurality of lattice cells 128. The dynamic stiffness datum may be calculated utilizing any of the methodologies and/or any combination thereof as described above in further detail in reference to FIG. 1. The dynamic stiffness datum for each lattice cell 128 of the plurality of lattice cells 128, as described above in further detail in reference to FIG. 1, is the frequency dependent ratio between a dynamic force and the resulting dynamic displacement, wherein an increase of the dynamic stiffness datum will reduce the resulting dynamic displacement. The dynamic stiffness datum is a frequency dependent ratio between a force and the resulting displacement. For instance, an increase of the dynamic stiffness datum will reduce the resulting displacement of the system. For example and without limitation, a completed part that will encounter a large amount of vibration frequency, such as a railroad fastening, should have an increased dynamic stiffness datum for each lattice cell 128 of the plurality of lattice cells 128 to reduce the noise and vibrations generated from the vibrational frequency by providing effective isolation of the structure from lower frequencies. Further examples of the dynamic stiffness datum are described above in further detail in reference to FIG. 1.

Still referring to FIG. 3, at step 310, step 215 of method 200 further comprises calculating, at simulation module 132, a strength-to-mass datum for each lattice cell 128 of the plurality of lattice cells 128. The strength-to-mass datum may be calculated utilizing any of the methodologies and/or any combination thereof as described above in further detail in reference to FIG. 1. The strength-to-mass datum for each lattice cell 128 of the plurality of lattice cells 128, as described above in further detail in reference to FIG. 1, is the force per unit area at failure divided by the density of lattice volume 124. Calculating the strength-to-mass datum may include calculating the volume of each lattice cell 128 of the plurality of lattice cells 128, calculating the density of each lattice cell 128 by dividing the mass of each lattice cell 128 of the plurality of lattice cells 128 by the volume of each lattice cell 128, and dividing the yield strength of the material to be used by the density of each lattice cell 128 of the plurality of lattice cells 128. The yield strength may be obtained from published yield strength values for each material of the plurality of materials used in additive manufacturing processes. The greater the strength-to-mass datum for each lattice cell 128 of the plurality of lattice cells 128 the greater the strength of the lattice cell 128 and the lighter weight the lattice cell 128 is. Further examples of the strength-to-mass datums are described above in further detail in reference to FIG. 1.

Continuing to refer to FIG. 3, at step 315, step 215 of method 200 further comprises selecting, at simulation module 132, a corresponding lattice cell as a function of the dynamic stiffness datum and the strength-to-mass datum for each lattice cell of the plurality of lattice cells. Selecting the corresponding lattice cell may be performed using any of the methodologies as described above in reference to FIG. 1. The corresponding lattice cell, as described above in reference to FIG. 1, is the lattice cell 128 of the lattice cells within the predetermined range value of dynamic stiffness datums with the greatest strength-to-mass datum value. Selecting the corresponding lattice cell further includes selecting the lattice cell 128 with a dynamic stiffness datum within a predetermined range value and selecting the lattice cell 128 with the greatest strength-to-mass datum value. The dynamic stiffness datum may include any dynamic stiffness datum as described in the entirety of this disclosure. The predetermined range value for the dynamic stiffness datum is determined as a function of the vibrational frequency the completed part will encounter in application, as described above in further detail in reference to FIG. 1. The predetermined range value for the dynamic stiffness datum is determined in accordance with ASTM D0638-14 Standard Test Method for Tensile Properties of Plastics, ASTM D790-17 Standard Test Methods for Flexural Properties of Unreinforced and Reinforced Plastics and Electrical Insulating Materials, ASTM E8 Standard Test Methods for Tension Testing of Metallic Materials, ASTM E9-19 Standard Test Methods of Compression Testing of Metallic Materials at Room Temperature, and the like. The greatest strength-to-mass-value is the strength-to-mass datum value is the calculated strength-to-mass datum with the greatest value of each lattice cell 128 of the plurality of lattice cells 128 that have a dynamic stiffness datum within the predetermined range.

Still referring to FIG. 3, in an embodiment, simulation module 132 is further designed and configured to apply a time-varying force to each lattice cell of the plurality of lattice cells, wherein the time-varying force vary in a pattern characteristic of a specific frequency. In an embodiment, simulation module 132 is further designed and configured to identify the frequency associated with a shortest mean-time-before-failure. The mean time-before-failure, as described above in reference to FIG. 1, is the length of time the completed part is expected to function in an application until failure, wherein the application is determined as a function of the product definition 116. Failure, as described in further detail in the entirety of this disclosure, is the when the completed product can no longer produce the desired result.

Figure 4:
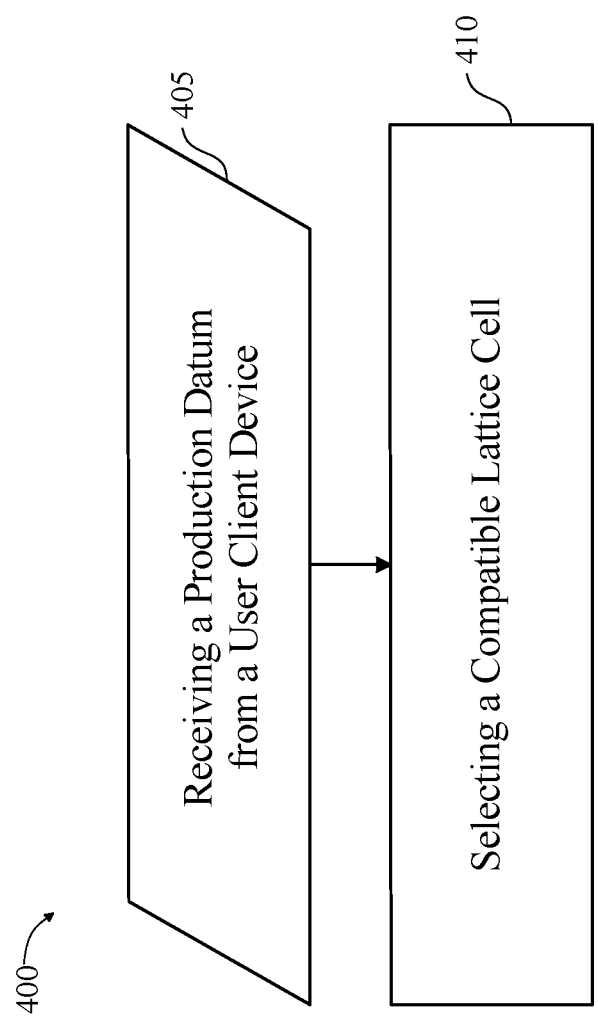
FIG. 4 is a process flow diagram illustrating an embodiment of determining a response characteristic of each lattice cell of the plurality of lattice cells.

Referring now to FIG. 4, in an embodiment, method 200 of generating a three-dimensional product having a cubic internal structure further comprises method 400. Method 400 for selecting, at compatibility module 140, a compatible lattice cell is illustrated. At step 405, compatibility module 140 operating on computing device 104 receives production datum 144 from user client device 112. The compatible lattice cell, as described above in further detail in reference to FIG. 1, is the lattice cell 128 of the lattice cells 128 compatible with production datum 144 with the lowest value of production total. Receiving production datum 144 may include user entry utilizing user client device 112, wherein the user client device may include any user client device as described herein. Production datum 144, as described above in further detail in reference to FIG. 1, is any element of data describing an attribute, constraint, specification, and/or detail of the manufacturing process to additively manufacture manufacturing request datum 108. An element of data describing an attribute, constraint, specification, and/or detail of the manufacturing process. For example a production datum 144 may include an operational time datum, such as the time to manufacture manufacturing request datum 108. As a further example production datum 144 may include a material datum, such as the material used to manufacture the completed part, wherein a material datum may include metals, thermoplastics, thermosets, ceramics, graphite, biodegradable materials, medical and biochemical materials, nylons, acetals, polycarbonates, and the like. As a further example, production datum 144 may include a material form datum, such as the process to get a material from the raw form to a usable material for manufacturing. Another example of production datum 144 may include a tool count datum, such as the different manufacturing techniques required to manufacture the completed part. A further example of production datum 144 may include a part face count datum, such as the total number of faces on the part to be manufactured.

With continued reference to FIG. 4, at step 410, compatibility module 140 operating on computing device 104 further comprises selecting a compatible lattice cell. Selecting the compatible lattice cell may be performed using any of the methodologies as described above in reference to FIG. 1. The compatible lattice cell, as described above in further detail in reference to FIG. 1, is the lattice cell 128 of the lattice cells 128 compatible with production datum 144 with the lowest value of production total. Selecting the compatible lattice cell may include generating a second loss function as a function of the production datum 116 and the production total and minimizing the second loss function. Loss function may include any of the loss function as described above in reference to FIG. 1. A production total, as described above in further detail in reference to FIG. 1, is the total cost to manufacture the part included in the manufacturing request datum 108 including each lattice cell 128 of the plurality of lattice cells 128 in each lattice volume 124. Compatibility module 140 operating on computing device 104 may compare each lattice cell 128 of the plurality of lattice cells 128 and the production total to a mathematical expression representing an optimal combination of the production datum 144. The production datum 144 may be user entered utilizing user client device 112, wherein the user client device may include any user client device as described herein. Mathematical expression may include a linear combination of variables, weighted by coefficients representing relative importance of each variable in generating a completed part utilizing additive manufacturing, as described in further detail in the entirety of this disclosure. Mathematical expression and/or loss function may be provided by receiving one or more user commands, as described in further detail in the entirety of this disclosure. Mathematical expression and/or loss function may be generated using any methods and/or combination of methods as described in further detail throughout the entirety of this disclosure.

Figure 5:
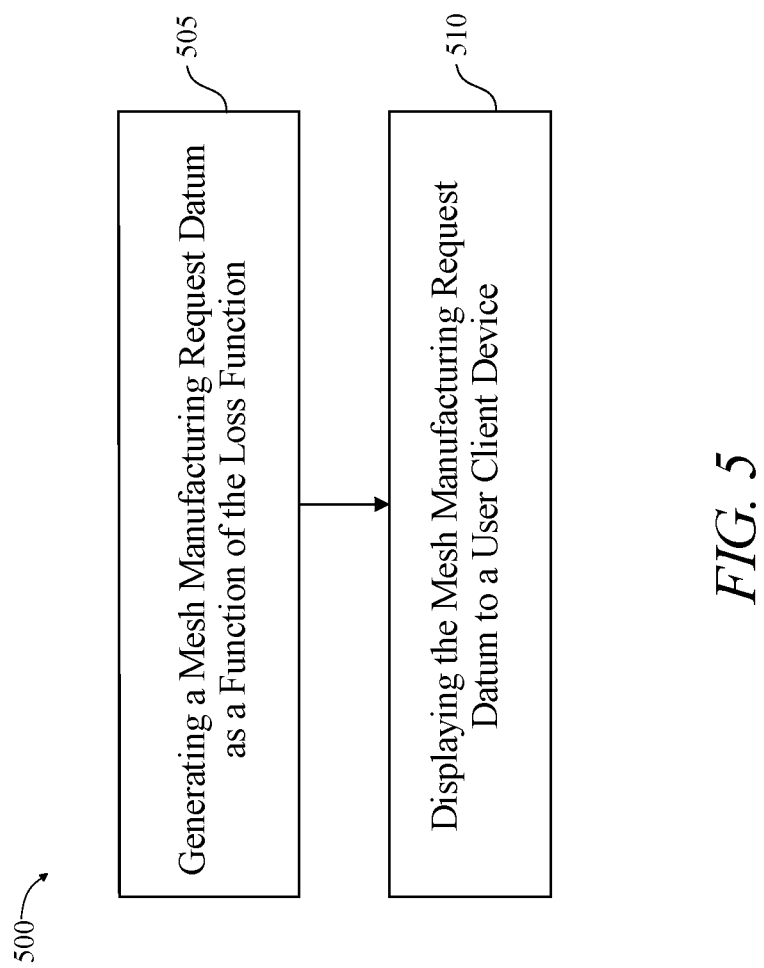
FIG. 5 is a process flow diagram illustrating an embodiment of determining a response characteristic of each lattice cell of the plurality of lattice cells.

Referring now to FIG. 5, in an embodiment, method 200 of generating a three-dimensional product having a cubic internal structure further comprises method 500. Method 500 for displaying the mesh manufacturing request datum to user client device 112 is illustrated. At step 505, simulation module 132 operating on computing device 104 further comprises generating the mesh manufacturing request datum as a function of the first loss function and the second loss function. Generation may be performed utilizing any of the methodologies and/or combination of methodologies, as described above in reference to FIG. 1. A mesh manufacturing datum, as described above in further detail in reference to FIG. 1, is the computer model of the part included in the manufacturing request datum 108, wherein the computer model of the part includes lattice volume 124 contained with repeated translations of the corresponding lattice cell. The mesh manufacturing datum may further include the computer model of the part included in the manufacturing request datum 108, wherein the computer model of the part includes lattice volume 124 contained with repeated translations of the compatible lattice cell. The computer model may include any computer model as described above in reference to FIG. 1. Repeated translation, as described above in further detail, is the translation of the lattice cell across the x-axis, y-axis and z-axis until the total volume of lattice volume 124 is occupied by a lattice cell. Generating the mesh manufacturing request datum may include the integration of the translation of the corresponding lattice cell in lattice volume 124 of the part of manufacturing request datum 108, as described above in further detail in reference to FIG. 1. Generating the mesh manufacturing request datum may include the integration of the translation of the compatible lattice cell in lattice volume 124 of the part of manufacturing request datum 108, as described above in further detail in reference to FIG. 1.

Continuing to refer to FIG. 5, at step 510, simulation module 132 operating on computing device 104 further comprises displaying the mesh manufacturing request datum to user client device 112. The mesh manufacturing datum is displayed to a user client device 112 utilizing any methodology and/or combination of steps of methodology as described above in further detail in the entirety of this disclosure. Display, for example and without limitation, may include displaying the mesh manufacturing datum to a user client device 112 utilizing a graphical user interface (GUI). A GUI may include without limitation, a graphical element having display capabilities, wherein a user may view the mesh manufacturing datum.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
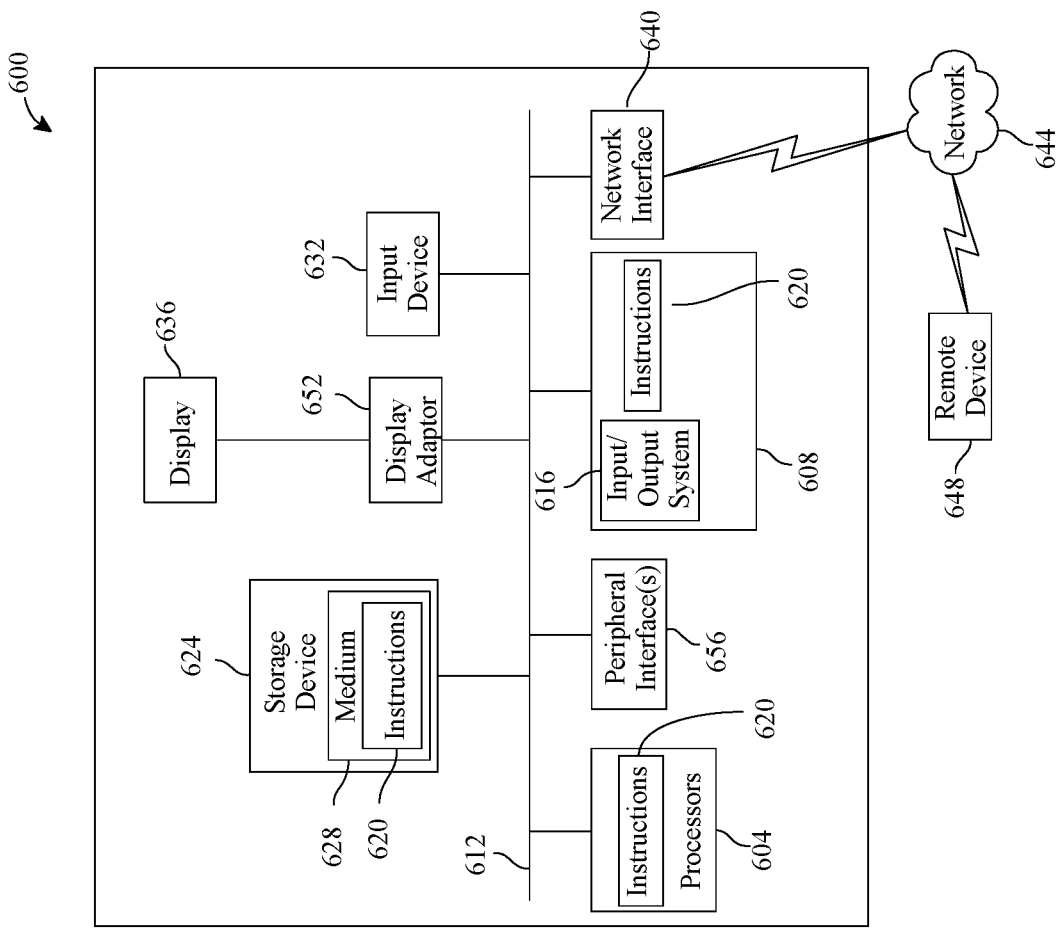
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of generating a three-dimensional product having a cubic internal structure in a process controlled by a computing device, the method of generating a three-dimensional product comprising:
   receiving a manufacturing request datum from a user client device, wherein the manufacturing request datum further comprises at least an element of a product definition wherein the at least an element of a product definition comprises a descriptive attribute of forces to be experienced by a completed part;
   defining a lattice volume of the manufacturing request datum, wherein defining the at least a lattice volume further comprises:
   defining at least a lattice cell of a plurality of lattice cells, wherein the plurality of lattice cells are disposed within the lattice volume, wherein each lattice cell of the plurality of lattice cells comprises a three-dimensional pattern of the entire lattice volume;
   determining a response characteristic of each lattice cell of the plurality of lattice cells, wherein determining the response characteristic further comprises:

simulating an application of at least a force on at least a part of the product as a function of the product definition through a simulation module, wherein the simulation module is configured to identify crack nucleation and final fracture of each lattice cell of the plurality of lattice cells, wherein simulating the application of the at least a force comprises:
applying an applied load with a constant amplitude to each lattice cell of the plurality of lattice cells until failure of the three-dimensional product; and
determining a number of loading cycles of the applied load before the failure of the three-dimensional product;
calculating a dynamic stiffness datum for each lattice cell of the plurality of lattice cells;
calculating a strength-to-mass datum for each lattice cell of the plurality of lattice cells; and
selecting a corresponding lattice cell as a function of the dynamic stiffness datum and the strength-to-mass datum for each lattice cell of the plurality of lattice cells, wherein selecting further comprises:
selecting a corresponding lattice cell option with a dynamic stiffness datum within a predetermined value range; and
selecting the corresponding lattice cell option with the greatest strength-to-mass datum value;
selecting a unit structure at the simulation module, wherein selecting the unit structure further comprises:
generating a minimized first loss function of a geometric datum of the at least a lattice cell and the response characteristic, wherein generating the minimized first loss function further comprises:
providing a graphical user interface (GUI) to a user and receiving a user command through the GUI;
receiving at least one variable relating to the completed part;
assigning a weighted coefficient representing relative importance of each of the at least one variable;
generating a first loss function based on the user command and the assigned weighted coefficients of each of the at least a variable of the plurality of variables; and
minimizing the first loss function; and
comparing the response characteristic of each lattice cell of the plurality of lattice cells to the minimized first loss function.

2. The method of claim 1, wherein the product definition further comprises the forces expected to be experienced by a finished product.

3. The method of claim 1, wherein defining the at least a lattice cell further comprises:
defining a junction point; and
defining a lattice ligament, wherein the lattice ligament interconnects the junction point.

4. The method of claim 1, wherein simulating the application of at least a force on at least a part of the manufacturing request datum as a function of the product definition further comprises:
applying a time-varying force to each lattice cell of the plurality of lattice cells, wherein the time-varying force vary in a pattern characteristic of a specific frequency; and
identifying a frequency associated with a shortest mean-time-before-failure.

5. The method of claim 1, wherein the geometric datum comprises a dimension of a void space of the at least a lattice cell.

6. The method of claim 1, wherein the method of generating a three-dimensional product further comprises:
receiving a production datum from the user client device;
selecting a compatible lattice cell, wherein selecting further comprises:
generating a second loss function as a function of the production datum and a production total; and
minimizing the second loss function.

7. The method of claim 6, wherein the production datum comprises a material form datum.

8. The method of claim 1, wherein the method of generating a three-dimensional product further comprises:
generating a mesh manufacturing request datum as a function of the first loss function and a second loss function; and
displaying the mesh manufacturing request datum to the user client device.

9. The method of claim 1, wherein receiving the user command further comprises providing the user with a set of sliders through the GUI.

10. A system for generating a three-dimensional product having a cubic internal structure in a process controlled by a computing device, the system for generating a three-dimensional product is designed and configured to:
receive a manufacturing datum from a user client device comprising a user client computing device, wherein the manufacturing request datum further comprises at least an element of a product definition wherein the at least an element of a product definition comprises a descriptive attribute of forces to be experienced by a completed part;
define, at a dimensional module, a lattice volume of the manufacturing request datum, wherein defining the at least a lattice volume is further designed and configured to:
define at least a lattice cell of a plurality of lattice cells, wherein the plurality of lattice cells are comprised within the lattice volume, wherein each lattice cell of the plurality of lattice cells comprises a three-dimensional pattern of the entire lattice volume;
determine, at a simulation module, a response characteristic of each lattice cell of the plurality of lattice cells, wherein determining the response characteristic further comprises:
simulating an application of at least a force on at least a part of the product as a function of the product definition through a simulation module, wherein the simulation module is configured to identify crack nucleation and final fracture of each lattice cell of the plurality of lattice cells, wherein
simulating the application of the at least a force comprises:
applying an applied load with a constant amplitude to each lattice cell of the plurality of lattice cells until failure of the three-dimensional product; and
determining a number of loading cycles of the applied load before the failure of the three-dimensional product;
calculating a dynamic stiffness datum for each lattice cell of the plurality of lattice cells;
calculating a strength-to-mass datum for each lattice cell of the plurality of lattice cells; and
selecting a corresponding lattice cell as a function of the dynamic stiffness datum and the strength-to-mass datum for each lattice cell of the plurality of lattice cells, wherein selecting the corresponding lattice cell further comprises:

selecting a corresponding lattice cell option with a dynamic stiffness datum within a predetermined value range; and selecting the corresponding lattice cell option with the greatest strength-to-mass datum value;

select, at the simulation module, a unit structure, wherein selecting the unit structure is further designed and configured to:

generate a minimized first loss function as a function of a geometric datum of the lattice cell and the response characteristic, wherein generating the minimized first loss function further comprises:

providing a graphical user interface (GUI) to a user and receiving a user command through the GUI;

receiving at least one variable relating to the completed part;

assigning a weighted coefficient representing relative importance of each of the at least one variable;

generating a first loss function based on the user command and the assigned weighted coefficients of each of the at least a variable of the plurality of variables;

minimizing, at the simulation module, the first loss function; and comparing the response characteristic of each lattice cell of the plurality of lattice cells to the minimized first loss function.

11. The system of claim 10, wherein the product definition is further designed and configured to include the forces expected to be experienced by a finished product.

12. The system of claim 10, wherein defining the at least a lattice cell is further designed and configured to:

define a junction point; and define a lattice ligament, wherein the lattice ligament interconnects the junction point.

13. The system of claim 10, wherein simulating the application of at least a force on at least a part of the manufacturing request datum as a function of the product definition is further designed and configured to:

apply a time-varying force to each lattice cell of the plurality of lattice cells, wherein the time-varying force vary in a pattern characteristic of a specific frequency; and identify the frequency associated with a shortest mean-time-before-failure.

14. The system of claim 10, wherein the geometric datum comprises a dimension of a void space of the lattice cell.

15. The system of claim 10, wherein the system for generating a three-dimensional product is further designed and configured to:

receive, at a compatibility module, a production datum from the user client device; and select a compatible lattice cell, wherein selecting further comprises:

generating a second loss function as a function of the production datum and a production total; and minimizing the second loss function.

16. The system of claim 15, wherein the production datum comprises a material form datum.

17. The system of claim 10, wherein the system for generating a three-dimensional product is further designed and configured to:

generate, at the simulation module, a mesh manufacturing request datum as a function of the first loss function and a second loss function; and display, at the simulation module, the mesh manufacturing request datum to the user client device.

18. The system of claim 10, wherein the user command is received through a set of sliders of the GUI.

* * * * *